United States Patent [19]

Parsons

[11] 4,186,170

[45] Jan. 29, 1980

[54] METHOD OF PRODUCING A MOLDED PLASTIC ARTICLE

[75] Inventor: Roy B. Parsons, Leicester, England

[73] Assignee: Engraving Specialists (Leicester) Ltd., Leicester, England

[21] Appl. No.: 784,944

[22] Filed: Apr. 5, 1977

[30] Foreign Application Priority Data

Apr. 10, 1976 [GB] United Kingdom ............... 14734/76

[51] Int. Cl.² .................................................. B29C 9/00
[52] U.S. Cl. ...................................... 264/247; 264/24; 264/266; 264/296; 264/316; 264/338
[58] Field of Search ............... 264/294, 296, 320, 322, 264/131, 243, DIG. 66, 247, 163, 24, 266, 316, 318; 24/204

[56] References Cited

U.S. PATENT DOCUMENTS

| | | | |
|---|---|---|---|
| 1,337,254 | 4/1920 | Muench | 264/DIG. 66 |
| 2,211,102 | 8/1940 | Davis | 264/296 X |
| 2,318,950 | 5/1943 | Larmour | 264/320 X |
| 2,801,947 | 8/1957 | Winchester | 264/131 X |
| 2,979,776 | 4/1961 | Morin | 264/295 |
| 3,166,618 | 1/1965 | Fehling | 264/296 X |
| 3,192,589 | 7/1965 | Pearson | 24/204 |
| 3,471,903 | 10/1969 | Northrup | 24/204 X |
| 3,721,726 | 3/1973 | Schwartzman | 264/296 X |
| 3,781,401 | 12/1973 | Hanggi | 264/296 X |

Primary Examiner—Thomas P. Pavelko
Attorney, Agent, or Firm—Spensley, Horn, Jubas & Lubitz

[57] ABSTRACT

The invention relates to a method of producing a molded plastic article simulating a base having one or more headed shanks extending therefrom by an injection molding operation using a specially shaped mold followed by deforming of the molded article by a heated platen.

4 Claims, 8 Drawing Figures

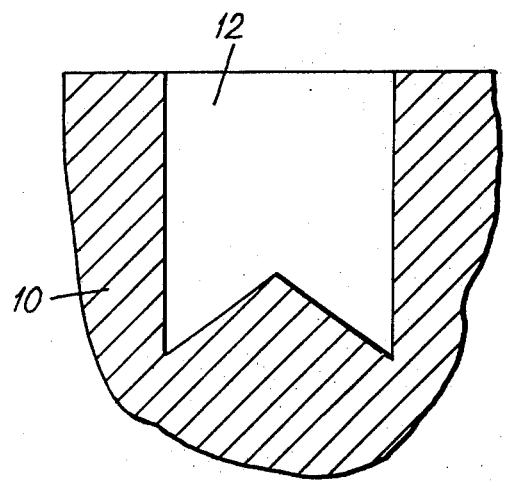
FIG.1
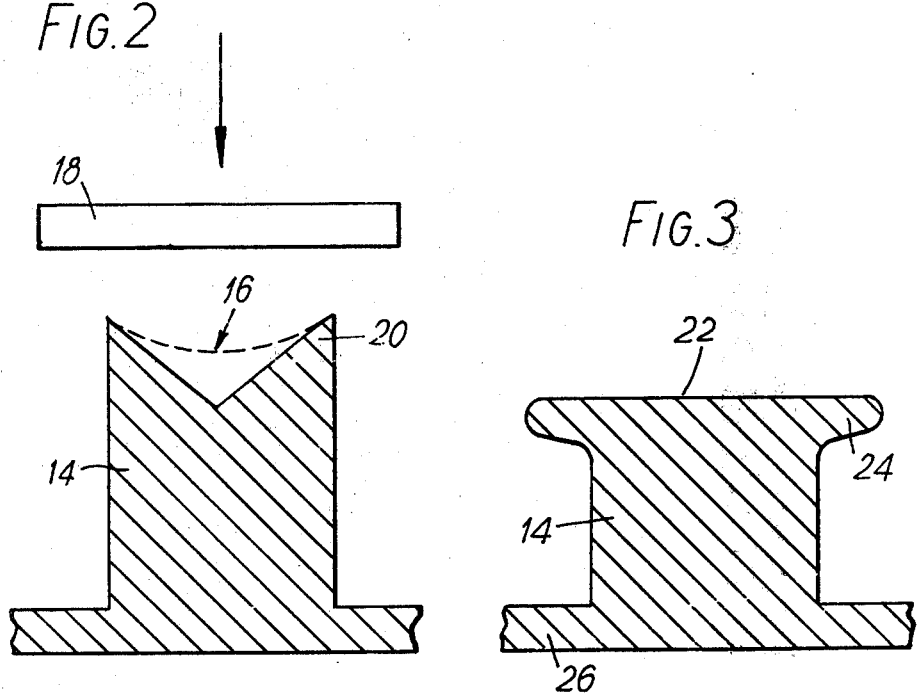
FIG.2
FIG.3

METHOD OF PRODUCING A MOLDED PLASTIC ARTICLE

The present invention relates to a method of producing a molded plastic article simulating a base having one or more headed shanks extending therefrom.

The term headed shank as used herein refers to a nail, pin, drawing pin (thumb tack) screw or the like having a shank portion at one end of which a head is integrally molded.

It is known to strike a plurality of pins or nails partly home into the surface of a piece of wood to form a pin array, the pins in the array being strung together subsequently with cord, yarn, or wire for example, to provide a pattern effect raised from the wood surface.

Kits of parts are available which comprise a wooden base board, a plurality of pins and cord or yarn for stringing the pins. To assemble the kit, a person hammers the pins partly into the board to produce the pin array.

One object of the present invention is to produce a simulated pin array which avoids an unsightly pattern effect of the prior art due to the pins becoming angled with respect to the base upon assembly by an unskilled person.

Another object of the present invention is to produce a simulated pin array which avoids the possibility of an unskilled person striking his fingers upon assembly of a pin array according to the prior art.

In accordance with the present invention these and other objects are achieved by providing in a method of producing a molded plastic article simulating a base having one or more headed shanks extending from said base the improvement of providing a mold having at least one mold cavity each corresponding with a headed shank to be molded, injecting a plastic material into the mold, permitting the plastic material to set, removing the article from the mold and placing a heated platen upon the upstanding shank or shanks formed by the mold cavities to shape the tops of each said shank into a simulated headed shank.

Other objects and advantages of the invention will become apparent with reference to the accompanying drawings in which:

FIG. 1 is a cross-sectional view throug a mold cavity for producing a plastic article in accordance with the invention, FIG. 2 is a cross-sectional view through a shank produced in the mold cavity of FIG. 1, and FIG. 3 is a cross-sectional view of a simulated pin or nail head in accordance with the invention.

Figure 4:
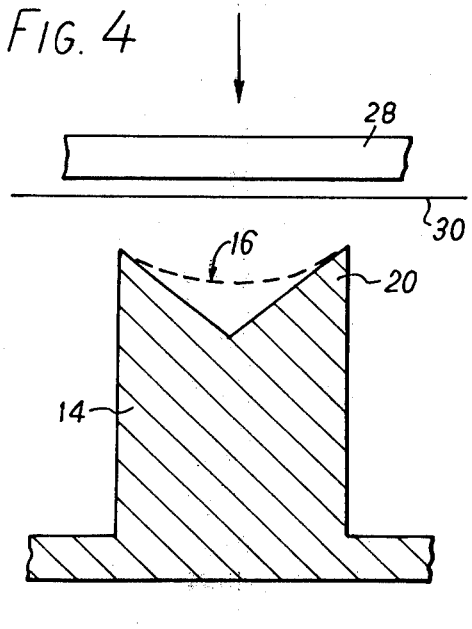
FIG. 4 is cross-sectional view through a shank produced in the mold cavity of FIG. 1 showing the shank prior to being blocked by a portion of a blocking machine.

In FIG. 1 part of a mold is shown as 10 and a mold cavity as 12. The mold is made from steel or other suitable material and provides a conically-shaped base to a bore which forms the mold cavity 12. Plastic material such as high impact polystyrene sold, for example, by VICTOR INTERNATIONAL, of Blackhorse Road, Coventry, England is injected into the mold and forms an upstanding shank 14 as may be seen in FIG. 2. The top of the shank 14 is conically recessed at 16, this recess matching the conically shaped mold cavity base.

A platen 18 heated by an electric heating element is lowered onto the shank 14 and in so doing causes the annular lip 20 of the shank 14 to be deformed radially outwardly until a flat surface 22 is produced as may be seen from FIG. 3. The shank 14 in FIG. 3 includes an annular flange 24 which extends around the flat 22. It will thus be seen that the shank 14 simulates the stem of a nail and the flat 22 simulates the head of the nail, the nail itself being partially struck into a molded base 26.

Figure 5:
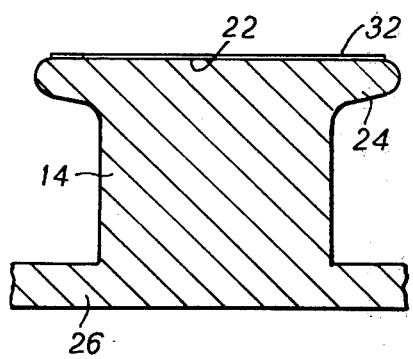
FIG. 5 is a cross-sectional view of a simulated pin or nail head in accordance with the invention subsequent to blocking.
Figure 6:
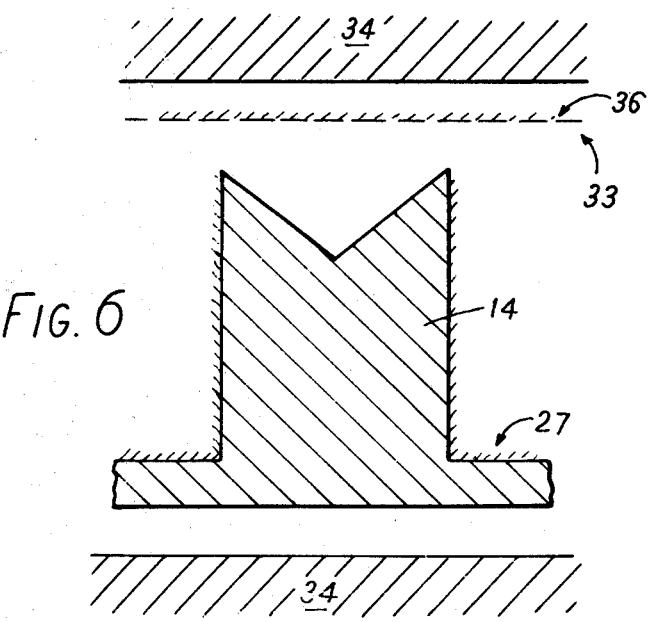
FIG. 6 is a cross-sectional view of a simulated pin or nail head the base of which is being flocked by a flocking machine.

In a preferred embodiment of the invention the platen is replaced by a blocking machine 28 having foil 30 of any desired colour disposed between the head of the machine and the shank 14 (see FIG. 4). In this way, when the blocking machine is operated, flats 22 are produced which have attached thereto a layer 32 of the foil, coloured for example gold or silver (see FIG. 5). Alternatively, the flats 22 may be produced first, following which the molded article may be passed through a blocking machine where the flats 22 are blocked.

The invention may be applied to lamp shades but is intended more particularly to be applied to pin boards for stringing. In this eventuality the base 26 which supports the pins may be provided with a flocked surface 27 by passing the board through an electrostatic flocking machine 33 having opposed electrostatic plates 34 and a flock supply 36 when the position shown in FIG. 2 of the drawings has been reached. Flats 22 are then provided in the manner previously described. Alternatively, the plastic material may be provided with an additive during the injection molding to simulate a wood effect on the base 26.

Figure 7:
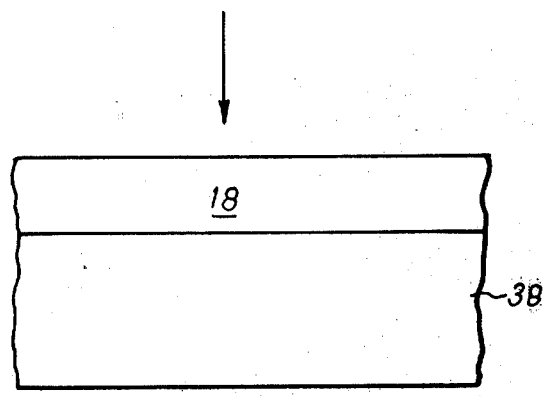
FIG. 7 is a cross-sectional view of a simulated pin or nail head prior to its head being molded with a domed shape.
Figure 7:
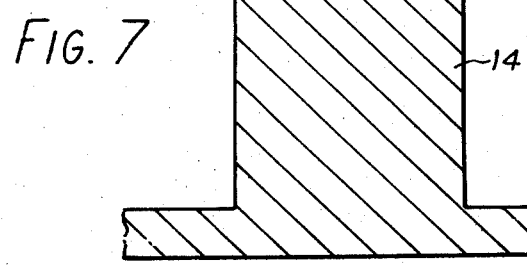
Figure 8:
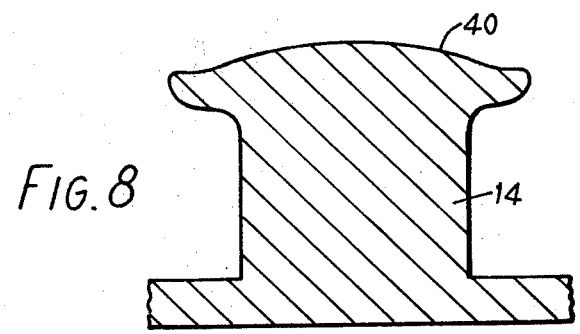
FIG. 8 is a cross-sectional view of the pin or nail shown in FIG. 7 after molding.

It is to be understood that whilst the simulated nail or pin heads have been described as flat, they may be domed or ridged as shown in FIG. 8 at 40 by placing a siliconised rubber surface 38 (See FIG. 7) between the platen or head of the blocking machine and the tops of the shank or shanks 14.

Although in the described embodiment of the invention the base of each mold cavity is conically-domed, the invention is equally applicable to the case where the base of each mold cavity is flat, or otherwise shaped, e.g. downwardly pointed.

Whilst a preferred embodiment of the invention has been described with respect to the drawings it will be apparent to those skilled in the art that various modifications and alterations may be resorted to without departing from the spirit and scope of the invention as defined in the appended claims.

What is claimed is:

1. A method of producing an integrally molded thermoplastic pinboard for handicrafts having a plurality of headed shanks extending therefrom comprising the steps of:
   (a) forming a base having a plurality of shank members extending outwardly from one side thereof, each said shank having a head with a conical recess and an annular lip;

(b) placing a flat, smooth siliconized rubbery surface which is part of a heated platen on the annular lip of each of said plurality of shanks; and (c) deforming said annular lip on each said shank radially outward thereby forming a rounded, circular head on each said shank.

2. A method of producing an integrally molded thermoplastic pinboard for handicrafts having a plurality of uniformly sized and shaped headed shanks extending therefrom comprising the steps of:

(a) forming a base having a plurality of shank members extending outwardly from one side thereof, each said shank having a head with a conical recess and an annular lip;

(b) placing the flat, smooth surface of a heated platen on the annular lip of each of said plurality of shanks; and (c) deforming said annular lip on each said shank radially outward thereby forming a flat, circular head on each said shank.

3. A method of producing a pinboard according to claim 2 wherein the method of forming said base with said outwardly extending headed shanks include the steps of:

injecting a plastic material into a mold having a plurality of cylindrical cavities, each said cavity having a conically domed based so as to form said conical recess in said shank head; and allowing said shanks to set.

4. A method as set forth in claim 2, wherein prior to step (c), including the additional step of:

placing a sheet of foil of a desired color between the conically recessed shank heads and the platen prior to the application thereto, thereby impressing a layer of said foil on said flat, circular head of each said shank.

* * * * *